US012762075B2

(12) United States Patent
Mari et al.

(10) Patent No.: US 12,762,075 B2

(45) Date of Patent: Oct. 13, 2026

(54) REPEATER FREQUENCY TRACKING

(71) Applicant: NXP USA, Inc., Austin, TX (US)

(72) Inventors: Ugo Mari, Pedara (IT); Steven Daniel, Gilbert, AZ (US); Andrea Mineo, Trecastagni (IT); Massimo Sorbera, Via Maugeri (IT)

(73) Assignee: NXP USA, Inc., Austin, TX (US)

( * ) Notice: Subject to any disclaimer, the term of this patent is extended or adjusted under 35 U.S.C. 154(b) by 57 days.

(21) Appl. No.: 19/043,011

(22) Filed: Jan. 31, 2025

(65) Prior Publication Data

US 2026/0228150 A1 Aug. 6, 2026

(51) Int. Cl.

*G06F 13/372* (2006.01)
*G06F 13/22* (2006.01)
*G06F 13/42* (2006.01)

(52) U.S. Cl.

CPC .......... *G06F 13/372* (2013.01); *G06F 13/225* (2013.01); *G06F 13/4282* (2013.01); *G06F 2213/0042* (2013.01)

(58) Field of Classification Search

CPC .. G06F 13/225; G06F 13/372; G06F 13/4282; G06F 2213/0042

See application file for complete search history.

(56) References Cited

U.S. PATENT DOCUMENTS

| | | | | |
|---|---|---|---|---|
| 11,658,852 | B2 * | 5/2023 | Chan | H04L 7/033 375/214 |
| 2018/0285227 | A1 * | 10/2018 | Sharma | H04L 43/20 |
| 2018/0293198 | A1 * | 10/2018 | Vertenten | G06F 13/4045 |
| 2021/0083917 | A1 * | 3/2021 | Konishi | H04L 27/2675 |
| 2021/0297228 | A1 * | 9/2021 | Li | H04L 7/005 |

* cited by examiner

*Primary Examiner* — Eric T Oberly

(57) ABSTRACT

Embodiments of a repeater, an embedded Universal Serial Bus (eUSB) repeater, and a method of operating a repeater are disclosed. In an embodiment, a repeater includes a frequency correction accumulator configured to generate a combined frequency correction based on a first frequency correction for compensating a mismatch between an input clock of a data source and a local transmitter clock and a second frequency correction for compensating a mismatch between the local transmitter clock and a local receiver clock and an adjustable timer configured to apply the combined frequency correction to regenerate an input data stream.

20 Claims, 9 Drawing Sheets

REPEATER FREQUENCY TRACKING

BACKGROUND

In some architectures, communication devices are designed to repeat traffic between upstream facing ports and downstream facing ports, in either direction, by passing a communication stream through an intermediate data link. Such devices may be referred to as "Hybrid Repeaters" borrowing from embedded Universal Serial Bus 2 (eUSB2) terminology.

SUMMARY

Embodiments of a repeater, an embedded Universal Serial Bus (eUSB) repeater, and a method of operating a repeater are disclosed. In an embodiment, a repeater includes a frequency correction accumulator configured to generate a combined frequency correction based on a first frequency correction for compensating a mismatch between an input clock of a data source and a local transmitter clock and a second frequency correction for compensating a mismatch between the local transmitter clock and a local receiver clock and an adjustable timer configured to apply the combined frequency correction to regenerate an input data stream. Other embodiments are also disclosed.

In an embodiment, the repeater further includes a decoder configured to decode symbols contained in data received over a repeater channel to generate the first frequency correction.

In an embodiment, the repeater further includes a difference calculator configured to generate the second frequency correction by comparing a symbol period of the symbols with a nominal symbol period.

In an embodiment, the frequency correction accumulator is further configured to combine the first frequency correction and the second frequency correction to generate the combined frequency correction.

In an embodiment, the adjustable timer is further configured to apply the combined frequency correction by controlling a recycling period of the repeater.

In an embodiment, the repeater further includes a modem configured to demodulate data received over a repeater channel to generate frames.

In an embodiment, the repeater further includes a de-framer configured to process the frames to generate symbols.

In an embodiment, the regenerated input data stream has same data rate as the data source.

In an embodiment, the data source has a latency requirement.

In an embodiment, the repeater includes an embedded Universal Serial Bus (eUSB) repeater.

In an embodiment, an embedded Universal Serial Bus (eUSB) repeater includes a frequency correction accumulator configured to combine a first frequency correction for compensating a mismatch between an input clock of a data source and a local transmitter clock and a second frequency correction for compensating a mismatch between the local transmitter clock and a local receiver clock to generate a combined frequency correction, and an adjustable timer configured to apply the combined frequency correction to regenerate an input data stream, where the regenerated input data stream has THE same data rate as the data source.

In an embodiment, the eUSB repeater further includes a decoder configured to decode symbols contained in data received over a repeater channel to generate the first frequency correction.

In an embodiment, the eUSB repeater further includes a difference calculator configured to generate the second frequency correction by comparing a symbol period of the symbols with a nominal symbol period.

In an embodiment, the adjustable timer is further configured to apply the combined frequency correction by controlling a recycling period of the eUSB repeater.

In an embodiment, the eUSB repeater further includes a modem configured to demodulate data received over a repeater channel to generate frames.

In an embodiment, the eUSB repeater further includes a de-framer configured to process the frames to generate symbols.

In an embodiment, the data source has a latency requirement.

In an embodiment, a method of operating a repeater includes generating a combined frequency correction based on a first frequency correction for compensating a mismatch between an input clock of a data source and a local transmitter clock and a second frequency correction for compensating a mismatch between the local transmitter clock and a local receiver clock and applying the combined frequency correction to regenerate an input data stream.

In an embodiment, the method further includes decoding symbols contained in data received over a repeater channel to generate the first frequency correction.

In an embodiment, the method further includes generating the second frequency correction by comparing a symbol period of the symbols with a nominal symbol period.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
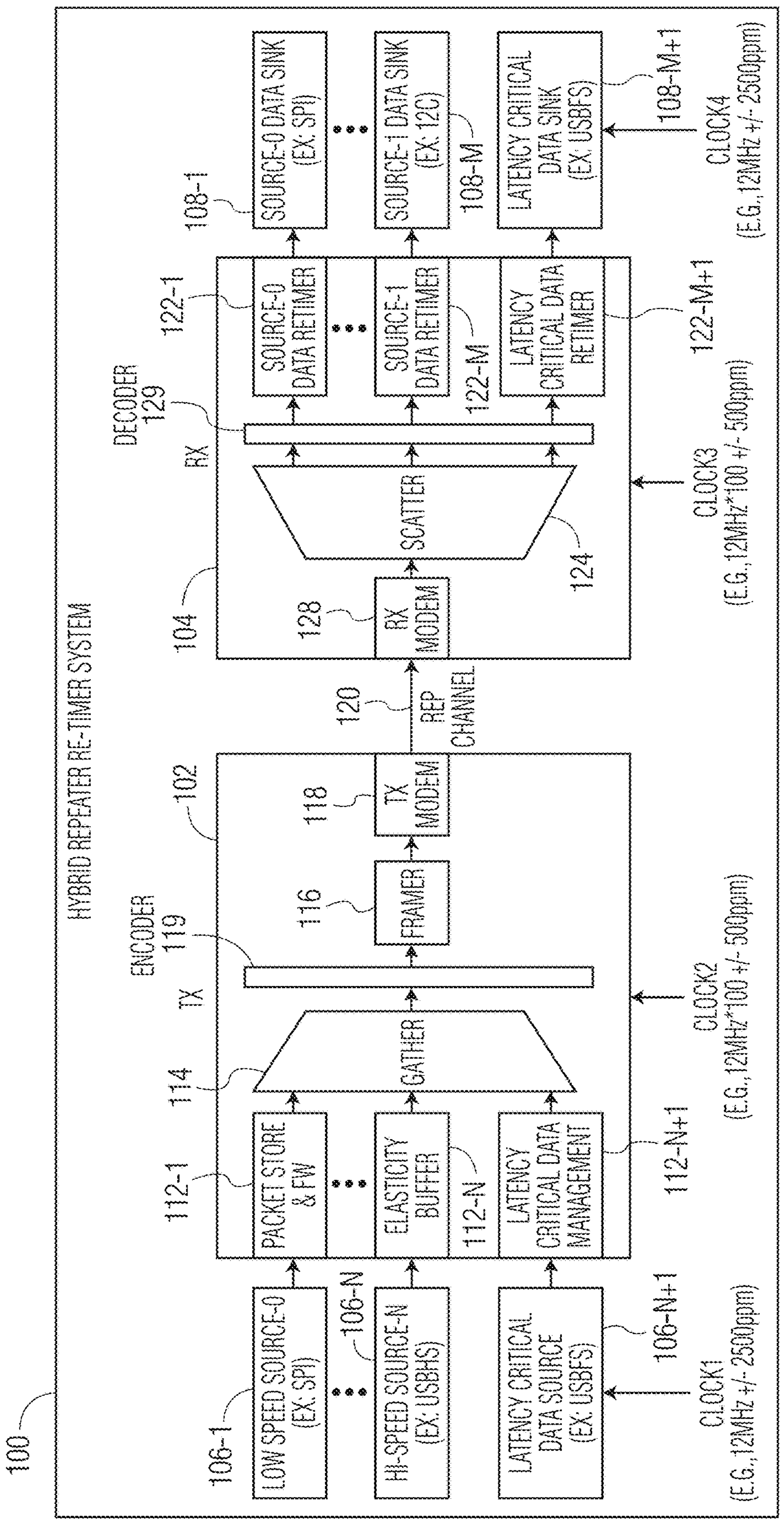
FIG. 1 depicts an example of a hybrid repeater re-timer system in accordance with an embodiment of the invention.

FIG. 1 depicts a hybrid repeater re-timer system 100 in accordance with an embodiment of the invention. In the embodiment depicted in FIG. 1, the hybrid repeater re-timer system 100 has a repeater channel 120 shared across multiple data sources and sinks. In the embodiment depicted in FIG. 1, the hybrid repeater re-timer system 100 includes a transmitter (TX) 102, a receiver (RX) 104, one or more data sources 106-1, . . . , 106-N+1, where N is a positive integer, and one or more data sinks 108-1, . . . , 108-M+1, where M is a positive integer. The hybrid repeater re-timer system 100 can be used in various applications, such as consumer or enterprise applications, medical applications, computer applications, and/or industrial applications. In the embodiment depicted in FIG. 1, the data sources 106-1, . . . , 106-N+1 include a low-speed data source (e.g., Serial Peripheral Interface (SPI)) 106-1, a high-speed data source (e.g., USB High Speed (USBHS)) 106-N, and a latency critical data source (e.g., USB Full Speed (USBFS)) 106-N+1, while the data sinks 108-1, . . . , 108-M+1 include a low-speed data source (e.g., SPI) 108-1, a high-speed data source (e.g., I2C) 108-M, and a latency critical data sink (e.g., USBFS) 108-M+1. In some embodiments, the hybrid repeater re-timer system 100 is a wired communications system, e.g., the repeater channel 120 is a wired channel. In some embodiments, the hybrid repeater re-timer system 100 is a wireless communications system, e.g., the repeater channel 120 is a wireless channel. The hybrid repeater re-timer system 100 may be fully or partially implemented as at least one integrated circuit (IC) device. In some embodiments, the transmitter (TX) 102 and the receiver (RX) 104 are located in separate substrates and are implemented as separate IC devices. Although the depicted hybrid repeater re-timer system 100 is shown in FIG. 1 with certain components and described with certain functionality herein, other embodiments of the hybrid repeater re-timer system 100 may include fewer or more components to implement the same, less, or more functionality. In addition, although the hybrid repeater re-timer system 100 is shown in FIG. 1 as being connected in a certain topology, the network topology of the hybrid repeater re-timer system 100 is not limited to the topology shown in FIG. 1. The hybrid repeater re-timer system 100 can be used in wireless and wired applications.

In the embodiment depicted in FIG. 1, the hybrid repeater re-timer system 100 can be used for aggregating multiple wired links to one shared connection which is the repeater channel, or for changing input transmission medium from passive wire to active logic, optical, wireless, or other connection, or for both of these and other reasons. In some embodiments, the hybrid repeater re-timer system 100 is compatible with an eUSB protocol, which deals with a wide range of signaling conditions.

To receive, send across intermediate link, and re-transmit serial data packets to the other side, input data needs to be digitally extracted from input stream, packetized, encoded, retimed, and possibly passed through other stages before of making them compatible for transmission on the intermediate link. Input signal digitalization causes loss of accurate source timing information, such as precise input data rate, because of the necessarily limited resolution of the sampling clock. Consequently, the repeated stream shall be regenerated at the TX repeater side 102 by re-clocking packet data.

In this repeater system architecture, repeaters work on local clocks, which can only synthesize slightly higher or slightly faster output rate with respect to the original input source. If the original source bit-rate is slower than the channel, the TX 102 cannot start transmitting data as soon as these get available from channel because, as TX rate is higher than Rx rate, the TX 102 could fall into underrun, meaning one RX data did not arrive in time for re-transmission such that last transmitted data gets repeated twice leading to packet corruption. In the case where source bit-rate is faster, the TX 102 would possibly not meet the latency requirements of the communication protocol because retransmission can take much longer than input reception on the line, with consequent delayed answer from the responding device and violate the max end-to-end delay requirement. Such problems are commonly resolved by store & forward technique (one full packet length is accumulated at the RX 104 before re-transmit starts) or by Elasticity buffer technique (sufficient number of bits to sustain max packet length is accumulated before starting transmission). Both techniques have storage latency penalty to pay on top of the latency paid to pass across the repeater channel.

Non-latency-sensitive data sources are not impacted by this problem, for example, low-bit-rate data sources are not timing critical with respect to the channel's frequency and channel's timing characteristics. High-speed data sources with limited clock skew tolerances and/or short packet length can be also normally accommodated by state of the art techniques thanks to the fast accumulation time spent in the elasticity buffer. However, medium rate latency critical traffic profiles are not suitable for re-transmission through the system as well as latency sensitive traffic profiles with very long or infinite packet length.

In the embodiment depicted in FIG. 1, the hybrid repeater re-timer system 100 aims to overcome re-transmission problem through hybrid repeater devices for latency critical/sensitive medium bit rate traffic profiles with considerable max packet length and/or considerable clock skew tolerance (e.g., USB Full-Speed) and latency sensitive traffic profiles with very high or infinite max packet length (e.g., Multi-channel Audio Digital Interface (MADI)). The hybrid repeater re-timer system 100 implements an end-to-end frequency tracking system to dynamically replicate the input data rate on the re-transmitting output. The hybrid repeater re-timer system 100 enables latency critical (e.g., USBFS), latency sensitive, and infinite/long maximum-packet (e.g., MADI) traffic profiles to be transported through the hybrid repeater re-timer system 100. Using dynamic input frequency replication to the output, the hybrid repeater re-timer system 100 can start data retransmission soon after the first one or two bits are received, independently from the maximum packet length specified by the peripheral protocol, avoiding to incur Tx-Underrun errors if source rate is slower, or in end-to-end signal delay errors if source rate is faster, caused by clock tolerances or frequency skews between the receive clock and the local clocks, and thus overcoming latency limitations associated to other repeater mechanisms such as Store & FW or Elasticity buffers. The hybrid repeater re-timer system 100 can measure the frequency mismatch between clock1 (input data source clock) and clock2 (TX local clock) at the TX 102, encode such signal frequency error into a minimum set of information required to replicate the same characteristics at the re-transmitting RX 104 end, transmit these information over the repeater channel 120, receive, decode, and apply this frequency correction at the RX 104 to finally regenerate (repeat) the input data stream. This is the first frequency correction contribution, which is generated and transmitted by the TX 102, sent through the repeater channel 120, and received and applied by the RX repeater 104. This first frequency correction contribution is required to compensate the frequency mismatch between clock1 and clock2 in FIG. 1. A second frequency correction contribution can be required to compensate the frequency mismatch between clock2 (the TX 102's local clock) and clock3 (the RX 104's local clock). This second frequency correction can be locally measured at the RX repeater 104 using similar method used by the TX but without the need of encoding and transmitting the frequency correction, as this second frequency correction can be directly combined with the first frequency correction and applied to the RX 104 to reproduce the same data rate as the original input stream. By this method, the hybrid repeater re-timer system 100 can deliver optimized latency, as it does not need to accumulate data bits before transmission can start, and precise input data rate replication at the TX output, as it continuously adjust and re-generate the timing at the re-transmitting output, while adding minimum bandwidth overhead on repeater channel link and limited output jitter injection due to the frequency clock adjustments.

In the embodiment depicted in FIG. 1, the transmitter (TX) 102 includes one or more storage units 112-1, . . . , 112-N+1 that, for example, include a packet store and forward (FW) module 112-1, an elasticity buffer 112-N, a latency critical data management module 112-N+1, an optional encoder 119, a gather 114, a framer 116, and a TX modem 118. In some embodiments, at least one of the packet store and forward (FW) module 112-1, the elasticity buffer 112-N, the latency critical data management module 112-N+1, the encoder 119, the gather 114, the framer 116, and the TX modem 118 is implemented in analog, digital, and/or firmware circuitry. In some embodiments, the encoder 119 is located between the storage units 112-1, . . . , 112-N+1 and the gather 114 or between the framer 116 and the TX modem. In an example operation, the packet store and forward (FW) module 112-1, the elasticity buffer 112-N, the latency critical data management module 112-N+1 receive data from the low-speed data source 106-1, the high-speed data source 106-N, and the latency critical data source 106-N+1, respectively, and send the received data to the gather 114 that aggregates the received data. The encoder 119 encodes the aggregated data to generate encoded data, which is processed by the framer 116, and modulated and outputted by the TX modem 118. In some embodiments, the gather 114 is implemented using a multiplexer or a sum unit.

In some embodiments, the encoder 119 is configured to generate symbols based on data from the data sources 106-1, . . . , 106-N+1, and the TX modem 118 is configured to transmit information in the symbols over a repeater channel 120. In some embodiments, the data sources include the latency critical data source 106-N+1. In some embodiments, the data sources 106-1, . . . , 106-N+1 include a first data source 106-1 with a first data speed and a second data source 106-N with a second data speed, and the first data speed is lower than the second data speed. In some embodiments, the framer 116 is configured to generate frames based on the symbols, where the TX modem 118 is configured to transmit the frames over the repeater channel 120. In some embodiments, the transmitter (TX) 102 is a component of an embedded Universal Serial Bus (eUSB) repeater. In some embodiments, the symbols have a size of four bits or twelve bits. In some embodiments, the symbols include a burst symbol that is composed of four-bit symbols. In some embodiments, the symbols include a clock adjustment symbol or a bus state symbol. In some embodiments, the symbols include a non-repeating (NREP) symbol, a start of packet (SOP) symbol, an extra data (XDAT) symbol, or a non-action (NOP) symbol.

In the embodiment depicted in FIG. 1, the receiver (RX) 104 includes one or more retimer units 122-1, . . . , 122-M+1 that can fully recover data, extract an embedded clock and retransmit a fresh copy of the data using a clean clock and for example, include a data retimer 122-1, a data retimer 122-M, a latency critical data retimer 122-M+1, a scatter 124, an optional decoder 129, and a RX modem 128. In some embodiments, at least one of the data retimer 122-1, the data retimer 122-M, the latency critical data retimer 122-M+1, the scatter 124, the decoder 129, and the RX modem 128 is implemented in analog, digital, and/or firmware circuitry. In some embodiments, the decoder 129 is located between the RX modem 128 and the scatter 124. In an example operation, data received through the repeater channel 120 is demodulated by the RX modem 128, separated by the scatter 124, and decoded by the decoder 129, and the decoded data from the decoder 129 are processed by the data retimer 122-1, the data retimer 122-M, and the latency critical data retimer 122-M+1, and stored in the low-speed data source (e.g., SPI) 108-1, the high-speed data source (e.g., I2C) 108-M, and the latency critical data sink (e.g., USBFS) 108-M+1, respectively. In some embodiments, the scatter 124 is implemented using a demultiplexer.

In accordance with an embodiment of the invention, the receiver (RX) 104 applies a combined frequency correction based on a first frequency correction received over the repeater channel 120 and a second frequency correction that is locally generated at the RX repeater and regenerate an input data stream received over the repeater channel based on the combined frequency correction. In some embodiments, the decoder 129 is configured to decode symbols contained in the input data stream to generate the first frequency correction. In some embodiments, the RX modem 128 is configured to demodulate the input data stream to generate frames. In some embodiments, the input data stream is generated by a data source with a latency requirement. In some embodiments, the RX modem 128 is configured to receive signals over the repeater channel 120 and the decoder 129 is configured to decode symbols based on the signals from the RX modem 128. In some embodiments, the receiver (RX) 104 is a component of an embedded Universal Serial Bus (eUSB) repeater. In some embodiments, the symbols have a size of four bits or twelve bits. In some embodiments, the symbols include a burst symbol that is composed of four-bit symbols. In some embodiments, the symbols include a clock adjustment symbol or a bus state symbol. In some embodiments, the symbols include a non-repeating (NREP) symbol, a start of packet (SOP) symbol, an extra data (XDAT) symbol, or a non-action (NOP) symbol.

In this embodiment, the input clock Clock2=(12 million hertz (MHz)*100)+/−500 parts per million (ppm) of the TX 102 and the input clock Clock3=(12 MHz*100)+/−500 ppm of the RX 104 are chosen with a multiplication factor of 100 with respect to the USB Full-Speed data rate (e.g., the clock Clock2=12 MHz+/−2500 ppm of the TX 102 and the clock Clock3=12 MHz+/−2500 ppm of the RX 104 are chosen). Lower multiplication factors may be used. In this embodiment, Clock2 and Clock3 run at higher speed with respect to the USB Full-Speed data rate for allowing the repeater to perform all the necessary steps within one bit period, and are also an integer multiple of the data rate to be in line with the USB frequency requirement. Moreover, Clock2 and Clock3 frequency must be high enough to measure and apply the clock adjustment factor with a precision compatible with the max jitter requirement. The indicated +/−500 ppm clock frequency tolerance is chosen in case the repeater system 100 can also support the USB High-Speed data rates. Otherwise, if limited to Full-Speed requirement, Clock2 and Clock3 clock frequency precision can be relaxed to +/−2500 ppm.

Figure 2:
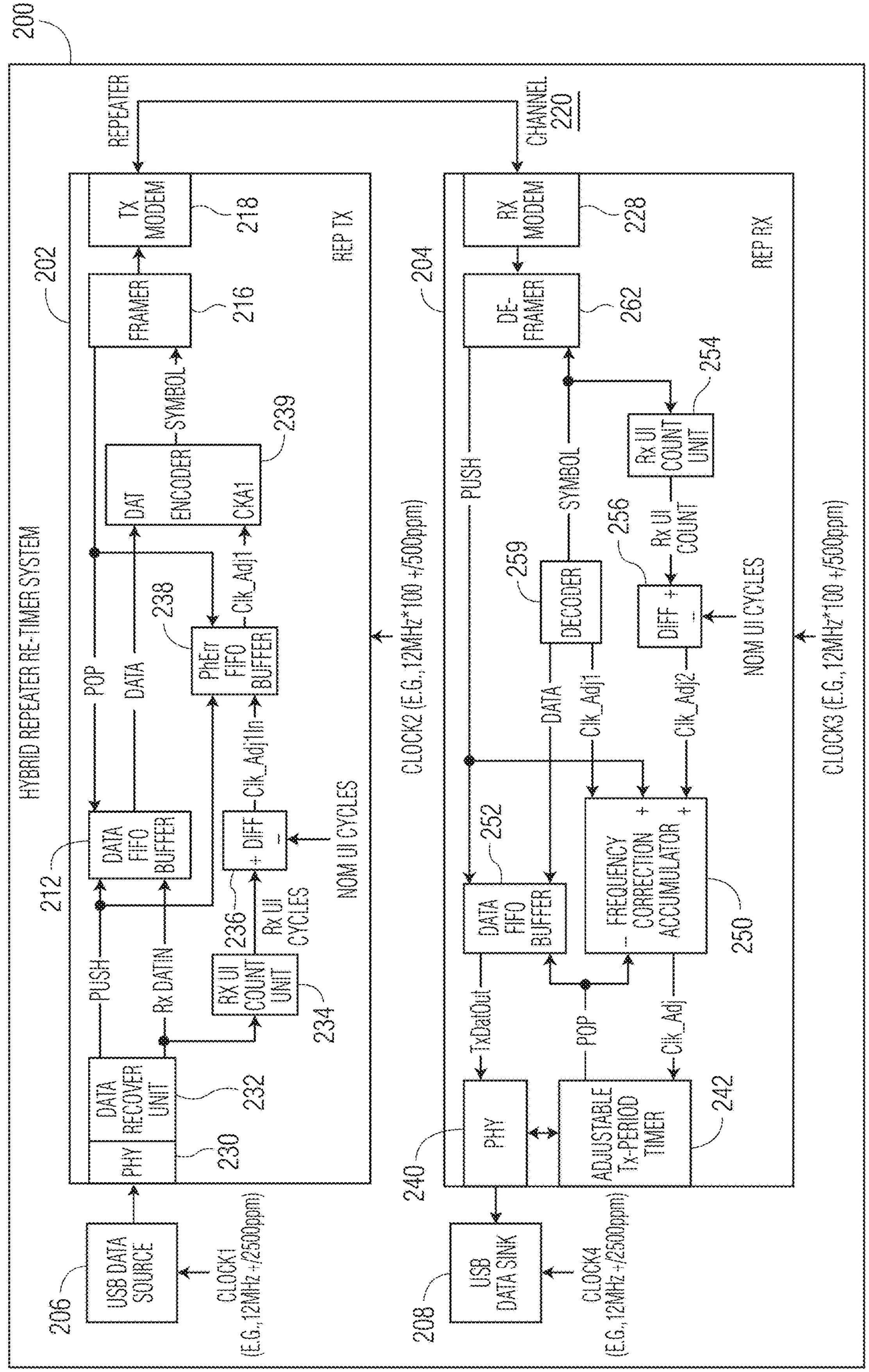
FIG. 2 depicts an example of a hybrid repeater re-timer system.

FIG. 2 depicts an embodiment of a hybrid repeater re-timer system 200 supporting downstream traffic repetition. The hybrid repeater re-timer system 200 depicted in FIG. 2 is an embodiment of the hybrid repeater re-timer system 100 depicted in FIG. 1. However, the hybrid repeater re-timer system 100 depicted in FIG. 1 is not limited to the embodiment depicted in FIG. 2. In some embodiments, symmetric embodiment is required to support repeater communication in the upstream direction.

In the embodiment depicted in FIG. 2, the hybrid repeater re-timer system 200 has a repeater channel 220 (e.g., a single serial link) between a data source (e.g., a USB data source) 206 and a data sink (e.g., a USB data sink) 208. In some embodiments, the hybrid repeater re-timer system 200 has one repeater channel (e.g., the repeater channel 220) between multiple data sources and multiple critical sinks. In the embodiment depicted in FIG. 2, the hybrid repeater re-timer system 200 includes a transmitter (TX) 202 and a receiver (RX) 204. The hybrid repeater re-timer system 200 may be fully or partially implemented as at least one integrated circuit (IC) device. In some embodiments, the transmitter (TX) 202 and the receiver (RX) 204 are located in separate substrates and are implemented as separate IC devices.

In the embodiment depicted in FIG. 2, the transmitter (TX) 202 includes a data recover unit 232, a PHY unit 230, a data First-in First-out (FIFO) buffer 212, an encoder 239, an RX Unit Interval (UI) counter unit 234, a difference calculator 236, a phase error FIFO buffer 238, a framer 216, and a TX modem 218. In some embodiments, at least one of the data recover unit 232, the data FIFO buffer 212, the encoder 239, the RX UI unit 234, the difference calculator 236, the phase error FIFO buffer 238, the framer 216, and the TX modem 218 is implemented in digital, and/or firmware circuitry. In some embodiments, the PHY unit 230 is implemented in analog, digital, and/or firmware circuitry. In some embodiments, the encoder 239 is configured to generate symbols based on data from the data source 206, and the TX modem 218 is configured to transmit information in the symbols over the repeater channel 220. In some embodiments, the framer 216 is configured to generate frames based on the symbols, where the TX modem 218 is configured to transmit the frames over the repeater channel 220. In some embodiments, the transmitter (TX) 202 is a component of an embedded Universal Serial Bus (eUSB) repeater. In some embodiments, the symbols have a size of four bits or twelve bits. In some embodiments, the symbols include a burst symbol that is composed of four-bit symbols. In some embodiments, the symbols include a clock adjustment symbol or a bus state symbol. In some embodiments, the symbols include a non-repeating (NREP) symbol, a start of packet (SOP) symbol, an extra data (XDAT) symbol, or a non-action (NOP) symbol.

In an example operation of the transmitter (TX) 202, based on signals from the data source 206 (e.g., USBFS) received through the PHY unit 230, the data recover unit 232 generates a push signal and a RX Datin signal, which are inputted into the data FIFO buffer 212, the RX UI count unit 234, and/or the phase error FIFO buffer 238. The data source 206 operates under a clock signal Clock1 and the transmitter (TX) 202 operates under a clock signal Clock2. Based on the RX Datin signal, the RX UI count unit 234 generates RX UI cycles, which are inputted into the difference calculator 236. The difference calculator 236 compares the RX UI cycles with Network Operations Management (NOM) UI cycles to generate a phase error signal Clk_AdjIn, which is inputted into the phase error FIFO buffer 238. Based on the push signal and the RX Datin signal, the data FIFO buffer 212 generates a Pop signal that is inputted into the phase error FIFO buffer 238, and a data signal, which is inputted into the encoder 239. Based on the Pop signal, the push signal, the phase error signal Clk_AdjIn, the phase error FIFO buffer 238 generates a clock adjustment signal Clk_Adj1, which is inputted into the encoder 239. Based on the data signal and the clock adjustment signal Clk_Adj1, the encoder 239 generates symbols, which are inputted into the framer 216. Based on the symbols and the Pop signal, the TX modem generates output signals to be transmitted through the repeater channel 220.

In the embodiment depicted in FIG. 2, the receiver (RX) 204 includes an adjustable TX-period timer 242, a PHY unit 240, a frequency correction accumulator 250, a data FIFO buffer 252, a decoder 259, an RX UI count unit 254, a difference calculator 256, a de-framer 262, and a RX modem 228. In some embodiments, at least one of the adjustable TX-period timer 242, the frequency correction accumulator 250, the data FIFO buffer 252, the decoder 259, the RX UI count unit 254, the difference calculator 256, the de-framer 262, and the RX modem 228 is implemented in digital and/or firmware circuitry. In some embodiments, the PHY unit 240 is implemented in analog, digital, and/or firmware circuitry. In some embodiments, the RX modem 228 is configured to receive signals over the repeater channel 220 and the decoder 259 is configured to decode symbols based on the signals from the RX modem 228. In some embodiments, the receiver (RX) 204 is a component of an embedded Universal Serial Bus (eUSB) repeater. In some embodiments, the symbols have a size of four bits or twelve bits. In some embodiments, the symbols include a burst symbol that is composed of four-bit symbols. In some embodiments, the symbols include a clock adjustment symbol or a bus state symbol. In some embodiments, the symbols include a non-repeating (NREP) symbol, a start of packet (SOP) symbol, an extra data (XDAT) symbol, or a non-action (NOP) symbol.

The hybrid repeater re-timer system 200 can measure the frequency mismatch between clock1 (input clock of the data source 206) and clock2 (the TX 202's local clock) at the TX 202 (the data recover unit 232, the RX UI count unit 234, the difference calculator 236, and the phase error FIFO buffer 238 perform this function), encode such signal frequency error (using the encoder 239) into a minimum set of information required to replicate the same characteristics at the re-transmitting RX 204, transmit these information over the repeater channel 220 (using the framer 216 and the modem 218), receive, decode, and apply this frequency correction at the RX 204 to finally regenerate (repeat) the input data stream. This is the first frequency correction contribution, which is generated and transmitted by the TX 202, sent through the repeater channel 220, and received and applied by the RX repeater 204. This first frequency correction contribution is required to compensate the frequency mismatch between clock1 (input clock of the data source 206) and clock2 (the TX 204's local clock) in FIG. 2. A second frequency correction contribution can be required to compensate the frequency mismatch between clock2 (the TX 204's local clock) and clock3 (the RX 204's local clock). This second frequency correction can be locally measured at the RX repeater 204 using similar method used by the TX 202 (using the RX UI count unit 254 and the difference calculator 256) but without the need of encoding and transmitting the frequency correction, as this second frequency correction can be directly combined with the first frequency correction (using the frequency correction accumulator 250) and applied to the adjustable transmit timer 242 to reproduce the same data rate as the original input stream. By this method, the hybrid repeater re-timer system 200 can deliver optimized latency, as it does not need to accumulate data bits before transmission can start, and precise input data rate replication at the TX output, as it continuously adjust and re-generate the timing at the re-transmitting output, while adding minimum bandwidth overhead on repeater channel link and limited output jitter injection due to the frequency clock adjustments.

In accordance with an embodiment of the invention, the adjustable TX-period timer 242 is configured to apply a combined frequency correction based on a first frequency correction calculated from the input stream of the data source 206 at the TX repeater 202 and encoded and transmitted over the repeater channel 220, and a second frequency correction that is calculated from a data stream of the repeater channel 220 at the RX repeater 204. The adjustable Tx-period Timer 242 drives the physical layer (PHY) 204 to regenerate the input data stream received from the data source 206 to the data sink 208, the regenerated stream having the same frequency of the input stream despite clock1 vs clock2 vs clock3 frequency mismatch. In some embodiments, the decoder 259 is configured to decode symbols contained in the input data stream to generate the first frequency correction. In some embodiments, the phase error FIFO buffer 258 is configured to generate the second frequency correction based on the distance between the symbols. In some embodiments, the frequency correction accumulator 250 is configured to combine the first frequency correction and the second frequency correction to generate the combined frequency correction. In some embodiments, the adjustable timer is further configured to apply the combined frequency correction by controlling a recycling period of the repeated stream at the data sink 208 (RX) 204. In some embodiments, the RX modem 228 is configured to demodulate the input data stream to generate frames. In some embodiments, the de-framer 262 is configured to process the frames to generate symbols. In some embodiments, the input data stream is generated by the data source 206 (e.g., USBFS) with a latency requirement. In some embodiments, the physical layer (PHY) unit 240 is configured to outputted a regenerated input data stream to the data sink 208 (e.g., USBFS) with a latency requirement. In some embodiments, the RX modem 228 is a component of an embedded Universal Serial Bus (eUSB) repeater.

In an example operation of the receiver (RX) 204, the RX modem 228 processes signals received from the TX modem 218 through the repeater channel 220 and outputs processed signals to the de-framer 262, which generates extracted symbols and a Push signal. The decoder 259 decodes the symbols to generate a TX Datin signal and a frequency correction factor CLK_adjust1. The RX UI Count unit 254 measures the symbol UI period and the difference calculator 256 compares the measured symbol period with the nominal symbol period to generate a frequency correction factor CLK_adjust2. The Clk_adjust1 and Clk_adjust2 frequency correction factors are accumulated into the frequency correction accumulator 250, which combines the two frequency correction factors by their algebraic sum. Based on a Pop signal from the adjustable TX-period timer 242, the frequency correction accumulator 250 gets decremented by the same quantity applied by the adjustable TX-period timer 242. The data FIFO buffer 252 generates a TXDATOUT signal based on the Pop signal, the Push signal, and the TX Datin signal. The adjustable TX-period timer 242 and the data FIFO buffer 252 transmit signals to the data sink 208 (e.g., USBFS) through the PHY unit 240. The data sink 208 operates under a clock signal Clock4 and the receiver (RX) 204 operates under a clock signal Clock3.

Figure 3:
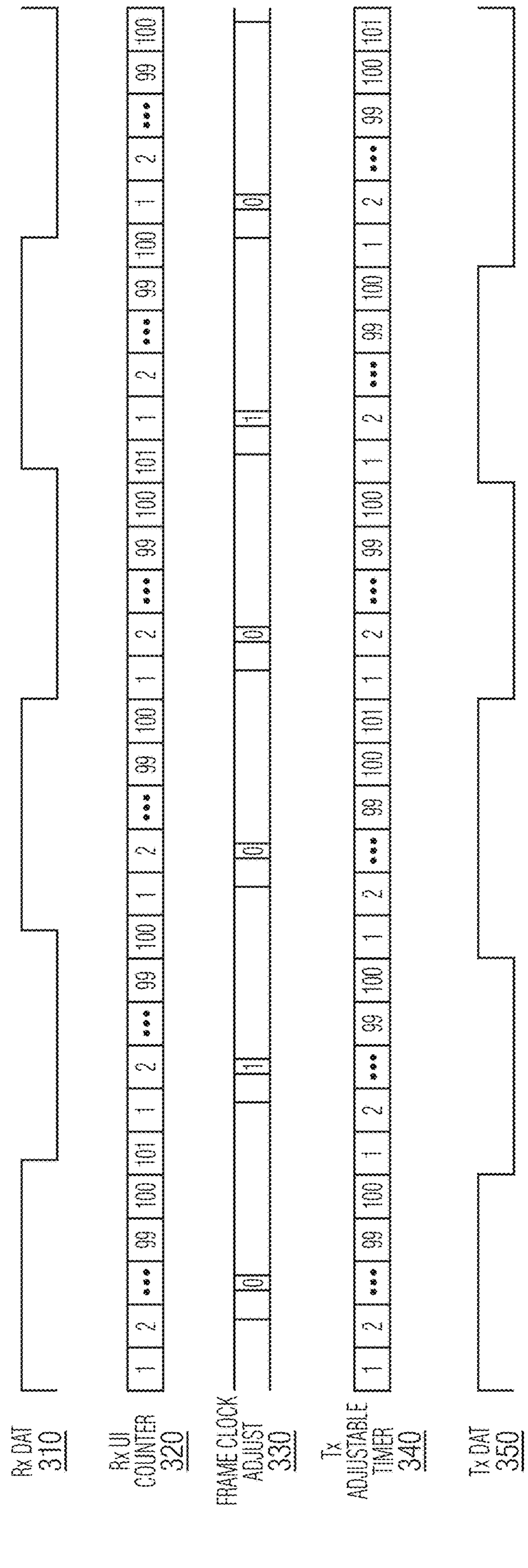
FIG. 3 shows example dynamic clock adjustment symbol information sent over a repeater channel to support eUSB latency requirement.

FIG. 3 shows example dynamic clock adjustment symbol information sent over the repeater channel 220 to support eUSB latency requirement. As shown in FIG. 3, the dynamic clock adjustment symbol information includes RX Data (RX Dat) 310, RX UI counter 320, Frame clock Adjustment 330, Tx Adjustable Timer 340, and TX Data (TX Dat) 350. As shown in FIG. 3, the Tx Adjustable Timer 340 increases by one or stays the same with respect to the RX UI counter 320, based on the value of the Frame clock Adjustment 330, which results in the frequency correction (i.e., shifting of falling edges and rising edges) of the TX Data (TX Dat) 350 that is output from the receiver (RX) 204 with respect to the RX Data (RX Dat) 310 that is received at the receiver (RX) 204. For example, frequency tracking exemplification may have USBFS UI=83.33 ns, Rep1freq=Rep2freq, USBFS vs Rep1freq=−3333 ppm.

Figure 4:
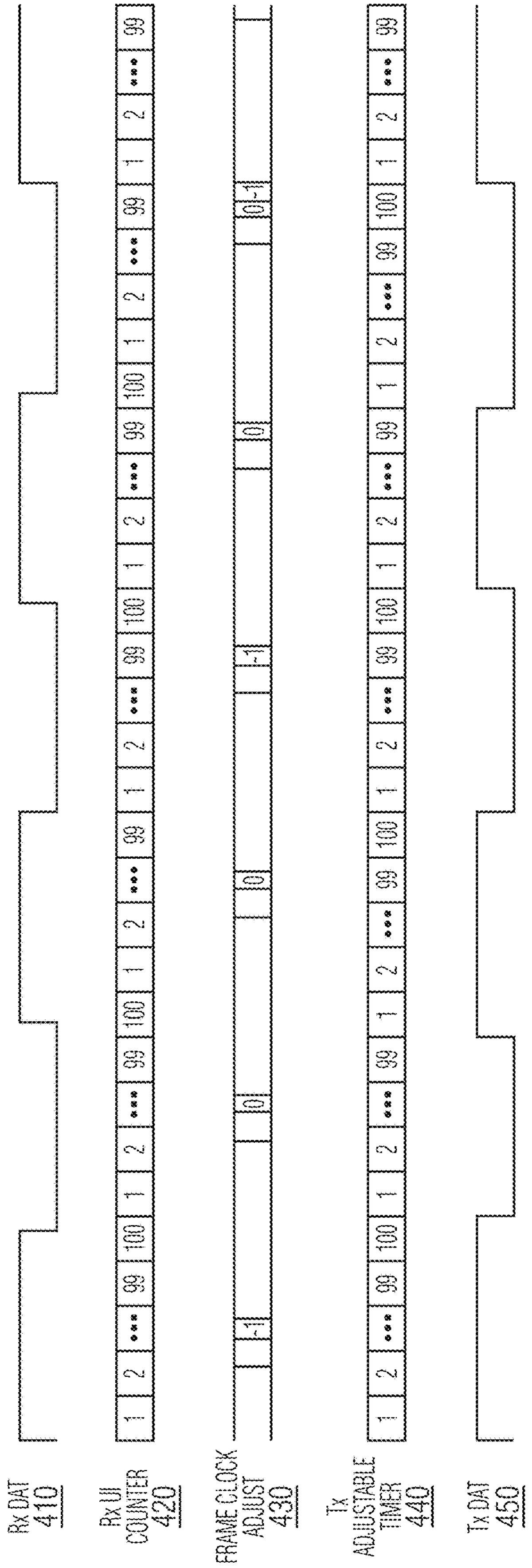
FIG. 4 shows example dynamic clock adjustment symbol information sent over a repeater channel to support eUSB latency requirement.

FIG. 4 shows example dynamic clock adjustment symbol information sent over the repeater channel 220 to support eUSB latency requirement. As shown in FIG. 4, the dynamic clock adjustment symbol information includes RX Data (RX Dat) 410, RX UI counter 420, Frame clock Adjustment 430, Tx Adjustable Timer 440, and TX Data (TX Dat) 450. In the example shown in FIG. 4, the USB bit rate is faster than frame repetition frequency due to eUSB input clock tolerance margin, clock adjustment extra data is sent (XDAT) as the last symbol. As shown in FIG. 4, the Tx Adjustable Timer 440 decreases by one or stays the same with respect to the RX UI counter 420, based on the value of the Frame clock Adjustment 430, which results in the frequency correction (i.e., shifting of falling edges and rising edges) of the TX Data (TX Dat) 450 that is output from the receiver (RX) 204 with respect to the RX Data (RX Dat) 410 that is received at the receiver (RX) 204. For example, frequency tracking exemplification may have USBFS UI=83.33 ns, Rep1freq=Rep2freq, USBFS vs Rep1freq=+3333 ppm.

In an example operation of the hybrid repeater re-timer system 200, the data recover unit 232 samples the input communication line at every transition. When transition is not present, the line is sampled on a periodical basis, depending on the nominal UI period or on the clock-period information recovered from the input stream. The RX UI count unit 234 measures the current UI period with respect to the nominal UI period by its high-speed granular clock at every Rx Data input transition. If/when the measured number of cycles is equal to an expected nominal, a "no clock adjustment" symbol is sent on a frame (e.g., CKA=0). If/when the measured number of cycles is higher than the expected nominal, the input stream frequency is slower than the frequency of the transmitter (TX) 202 and a +1 clock adjustment symbol is sent over the stream (e.g., CKA=+1). If/when the measured number of cycles is lower than the expected nominal, the input stream frequency is faster than the frequency of the transmitter (TX) 202 and a −1 clock adjustment symbol (e.g., CKA=−1) is sent over the stream. If/when the frequency mismatch between TX Input and the transmitter (TX) 202 clock is smaller than transmitter (TX) high-speed clock granularity, as it is expected in most cases, the phase error will be accumulating cycle-by-cycle until it becomes detectable by the measurement clock. In FIG. 2, USBFS example USB vs the transmitter (TX) 202 ppm difference is 3333 ppm (=UI/3) so that one clock deviation is captured every three UIs on average. As the transmitter (TX) 202 cannot apply itself the TX clock adjustment because radio frequency (RF) frame clock is not adjustable, as it is shared with other system data sources and by the receiver (RX) 204, the transmitter (TX) 202 sends relative clock adjustment information to the receiver (RX) 204 encoded into frame symbols at regular rates on the repeater channel 220. The receiver (RX) 204 implements the adjustable TX-period timer 242, which is a periodic timer that normally recycles when the nominal number of high-speed clock cycles forming an UI period is counted (100 cycles in FIG. 3 and FIG. 4 examples) and averagely receives one CKA symbol during every recycle. If, when starting to count the next UI period, the frequency correction accumulator 250 is empty, the adjustable TX-period timer 242 will count a nominal UI number of cycles (100 cycles in this example), thus keeping the output stream at the nominal speed as counted by the clock3 RX 204's clock reference. If instead the frequency correction accumulator 250 is not empty but contains a positive error correction, such as, CKA1=+1, then the adjustable TX-period timer 242 will decelerate by counting one cycle more (101 cycles in FIG. 3 example) to avoid a potential TX Underrun (same data sent twice) to occur during packet re-transmission due to the slow source data rate with respect to clock2+clock3 rates. If instead the frequency correction accumulator 250 is not empty but contains a negative error correction, such as, CKA1=−1, then the adjustable TX-period timer 242 will accelerate by counting one cycle less (99 cycles in FIG. 4 example) to avoid the RX Overrun (one data skipped) due to the faster source data rate with respect to the clock2+clock3 rates. If it can be assumed that the clock2 clock reference of the receiver (RX) 204 has the same frequency as the clock reference clock3 of the transmitter (TX) 202, then the first frequency error contribution CKA1, which is measured and transmitted by the TX 202, would be enough to recover the frequency mismatch between clock1 and clock2=clock3 at the re-transmitting output 240. Otherwise, a second frequency correction contribution is needed to recover frequency mismatch between clock1 and clock2 and between clock2 and clock3 at the re-transmitting output 240. This second frequency correction mechanism works same of the first frequency correction mechanism, but taking as input source the symbol periodically generated by the transmitter (TX) 202 on the channel. The second frequency correction mechanism generates the receiver (RX) 204's CKA2 frequency correction, which is algebraically summed to the transmitter (TX) 202's CKA1 in the frequency error accumulator 250. For example, if the transmitter (TX) 202 CKA1=+1 and the receiver (RX) 204 CKA2=−1, then the first and the second contributions cancel each other in the frequency error accumulator 250 and TxAT will recycle at the nominal value. If the transmitter (TX) 202 CKA=+1 and the receiver (RX) 204 CKA=+1, TxAT extends+2 the recycling period if permitted by the output jitter specification, otherwise it recycles at +1 and postpone second contribution to next recycle.

Figure 5:
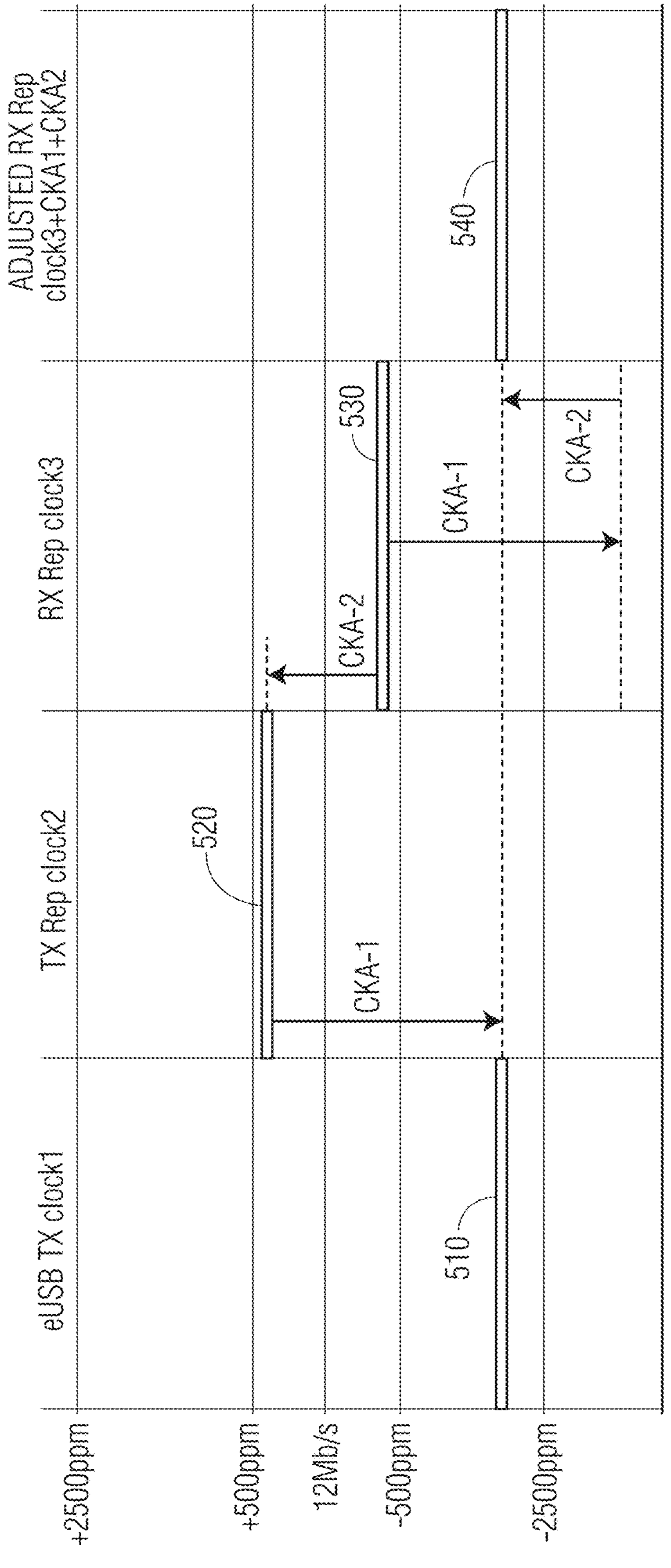
FIG. 5 shows a frequency tracking example of the hybrid repeater re-timer system depicted in FIG. 2.

FIG. 5 shows a frequency tracking example of the hybrid repeater re-timer system 200 depicted in FIG. 2. As shown in FIG. 5, a first frequency correction between an input clock of the data source 206 (eUSB TX clock1, represented by line 510) and the repeater TX 202's clock (clock2, represented by line 520) is CKA-1 and a second frequency correction between the repeater transmitter clock (clock2, represented by line 520) and the local RX 204's clock (clock3, represented by line 530) is CKA-2. Based on a combined frequency correction of CKA-1 and CKA-2, the adjusted RX clock (clock3+CKA1+CKA2, represented by line 540) matches (is identical with) the input clock of the data source 206 (eUSB TX clock1, represented by line 510).

Figure 6:
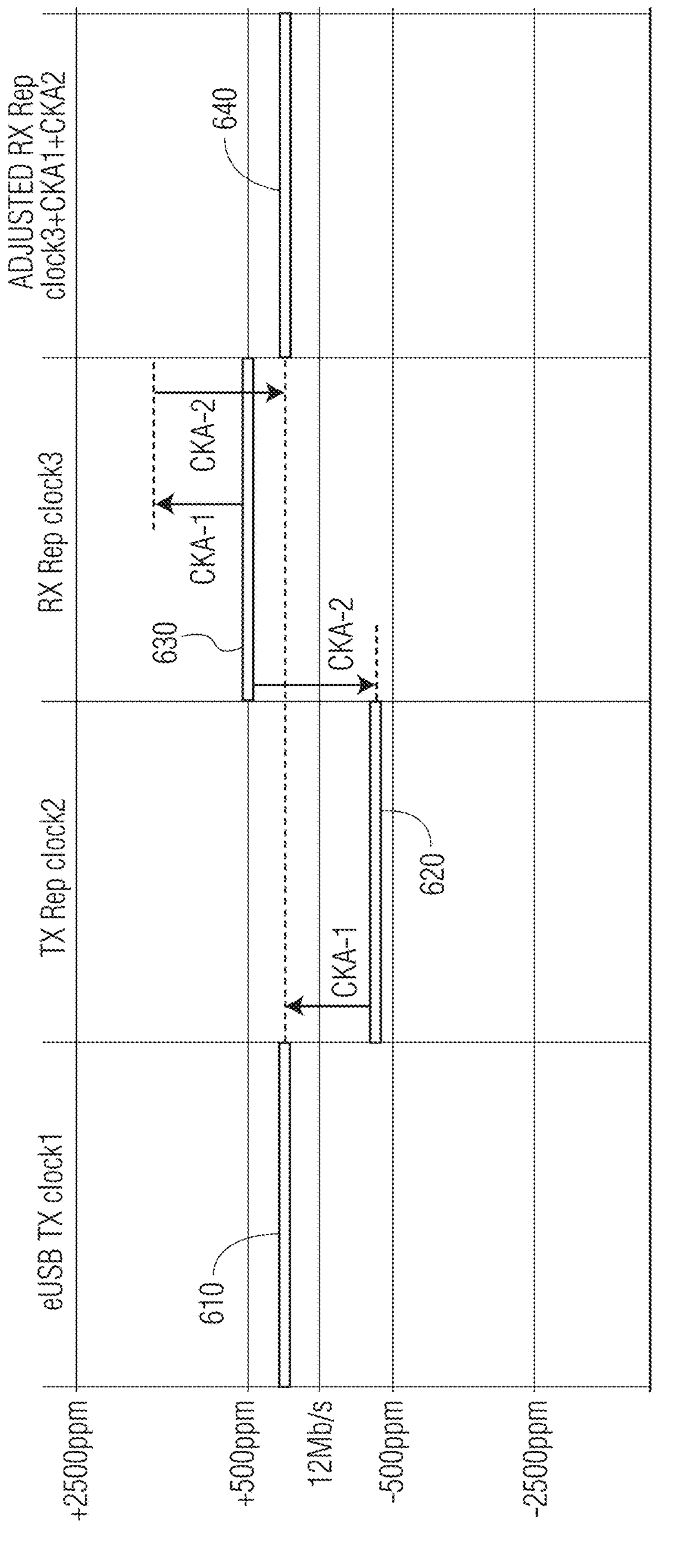
FIG. 6 shows a frequency tracking example of the hybrid repeater re-timer system depicted in FIG. 2.

FIG. 6 shows a frequency tracking example of the hybrid repeater re-timer system 200 depicted in FIG. 2. As shown in FIG. 6, a first frequency correction between an input clock of the data source 206 (eUSB TX clock1, represented by line 610) and the repeater TX 202's clock (clock2, represented by line 620) is CKA-1 and a second frequency correction between the repeater transmitter clock (clock2, represented by line 620) and the local RX 204's clock (clock3, represented by line 630) is CKA-2. Based on a combined frequency correction of CKA-1 and CKA-2, the adjusted RX clock (clock3+CKA1+CKA2, represented by line 640) matches (is identical with) the input clock of the data source 206 (eUSB TX clock1, represented by line 610).

Figure 7:
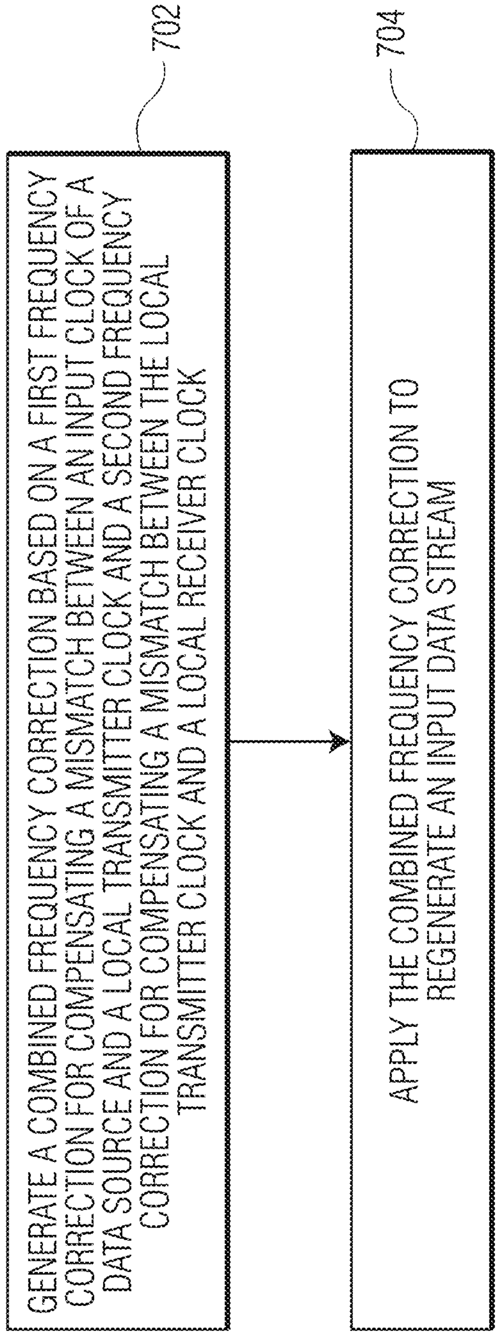
FIG. 7 is a process flow diagram of a method of operating a repeater in accordance with an embodiment of the invention.

FIG. 7 is a process flow diagram of a method of operating a repeater in accordance with an embodiment of the invention. At block 702, a combined frequency correction is generated based on a first frequency correction for compensating a mismatch between an input clock of a data source and a local transmitter clock and a second frequency correction for compensating a mismatch between the local transmitter clock and a local receiver clock. At block 704, the combined frequency correction is applied to regenerate an input data stream. In some embodiments, symbols contained in data received over a repeater channel are decoded to generate the first frequency correction. In some embodiments, the second frequency correction is generated by comparing a symbol period of the symbols with a nominal symbol period. The repeater may be the same as or similar to the receiver (RX) 104 depicted in FIG. 1, the hybrid repeater re-timer system 100 depicted in FIG. 1, the receiver (RX) 204 depicted in FIG. 2, and/or the hybrid repeater re-timer system 200 depicted in FIG. 2.

Figure 8:
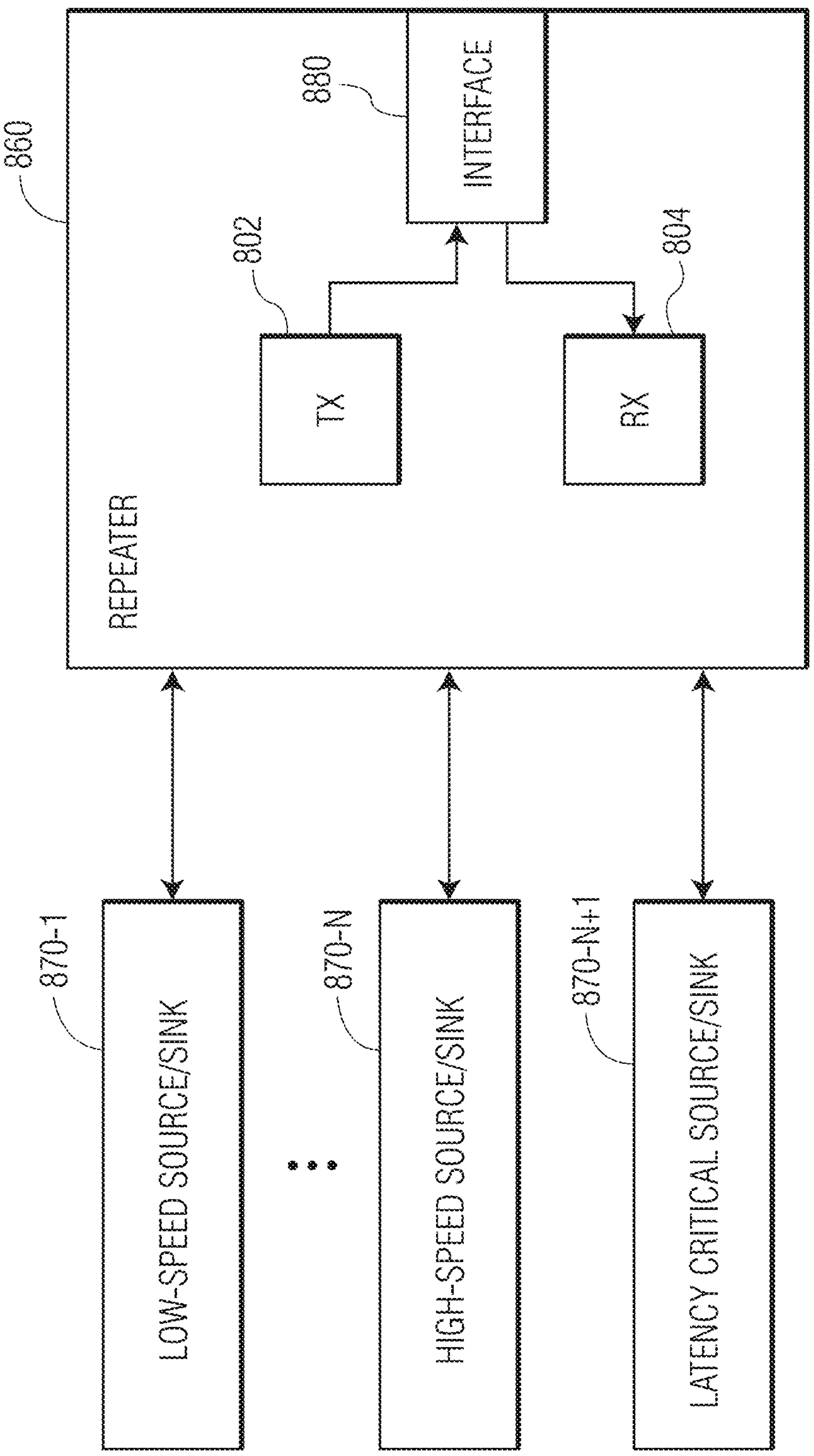
FIG. 8 depicts an example of a repeater in accordance with an embodiment of the invention.

FIG. 8 depicts an example of a repeater 860 in accordance with an embodiment of the invention. In the embodiment depicted in FIG. 8, the repeater 860 includes a transmitter (TX) 802, a receiver (RX) 804, and an interface 880, is connected to one or more data sources and/or sinks 870-1, . . . , 870-N+1, where N is a positive integer, through one or more links (e.g., a serial communications interface, such as, an USB interface (e.g., an eUSB interface)). For example, the TX 802 depicted in FIG. 8 may be an embodiment of the TX 102 depicted in FIG. 1 and/or the TX 202 depicted in FIG. 2. In an example, the RX 804 depicted in FIG. 8 may be an embodiment of the RX 104 depicted in FIG. 1 and/or the RX 204 depicted in FIG. 2. In some embodiments, the data sources and/or sinks 870-1, . . . , 870-N+1 include a low-speed data source/sink (e.g., Serial Peripheral Interface (SPI)) 870-1, a high-speed data source/sink (e.g., USB High Speed (USBHS)) 870-N, and a latency critical data source/sink (e.g., USB Full Speed (USBFS)) 870-N+1. The repeater 860 may be fully or partially implemented as an integrated circuit (IC) device. In the embodiment depicted in FIG. 8, the transmitter (TX) 802 and the receiver (RX) 804 are located in the same substrate and the repeater 860 is implemented as one IC device (e.g., a system on chip (SOC)) for bi-directional (downstream and upstream) communications. Although the depicted repeater 860 is shown in FIG. 8 with certain components and described with certain functionality herein, other embodiments of the repeater 860 may include fewer or more components to implement the same, less, or more functionality. In addition, although the repeater 860 is shown in FIG. 8 as being connected in a certain topology, the network topology of the repeater 860 is not limited to the topology shown in FIG. 8.

Figure 9:
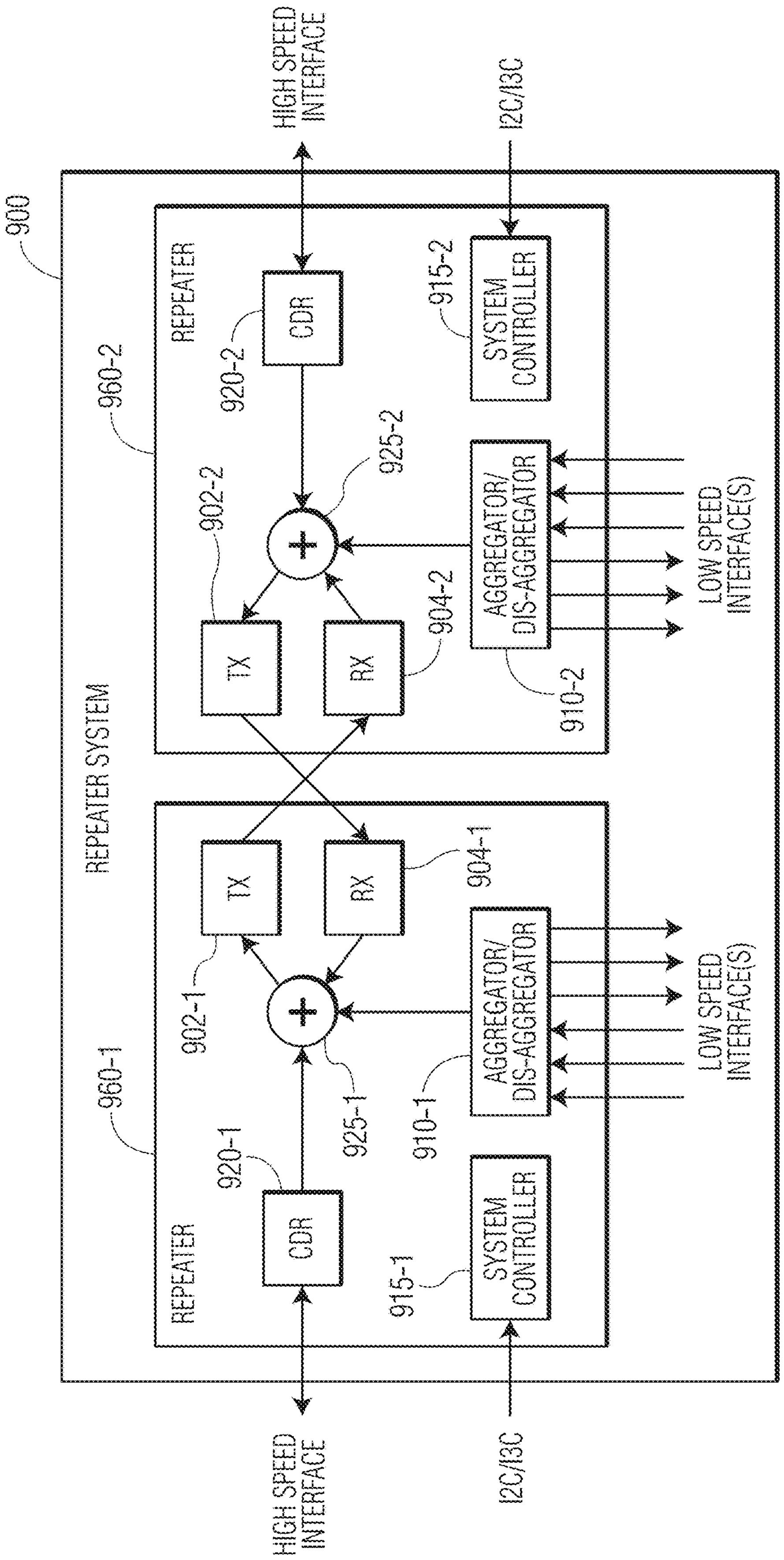
FIG. 9 depicts an example of a repeater system in accordance with an embodiment of the invention.

FIG. 9 depicts an example of a repeater system 900 in accordance with an embodiment of the invention. In the embodiment depicted in FIG. 9, the repeater system 900 includes a first repeater 960-1 that includes a transmitter (TX) 902-1, a receiver (RX) 904-1, an aggregator/dis-aggregator 910-1 that may be connected to one or more low speed interfaces (e.g., Universal Asynchronous Receiver/Transmitter (UART), Serial Wire Debug (SWD), or I2C), a system controller 915-1 that may be connected to I2C/I3C interface, a Clock Data Recovery (CDR) 920-1 that may be connected to a high speed interface, and a switch/multiplexer 925-1 and a second repeater 960-2 that includes a transmitter (TX) 902-2, a receiver (RX) 904-2, an aggregator/dis-aggregator 910-2 that may be connected to one or more low speed interfaces (e.g., Universal Asynchronous Receiver/Transmitter (UART), Serial Wire Debug (SWD), or I2C), a system controller 915-2 that may be connected to I2C/I3C interface, a Clock Data Recovery (CDR) 920-2 that may be connected to a high speed interface, and a switch/multiplexer 925-2. In the embodiment depicted in FIG. 9, the repeater system 900 is half-duplex, the TX 902-1 communicates with the RX 904-2 and the TX 902-2 communicates with the RX 904-1 over a serial channel (e.g., tying all four of the ports (2 TX and 2 RX) together) to implement both downstream and upstream traffic. The repeater system 900 may be an embodiment of the hybrid repeater re-timer system 100 depicted in FIG. 1 and/or the hybrid repeater re-timer system 200 depicted in FIG. 2. For example, the TXs 902-1, 902-2 depicted in FIG. 9 may be an embodiment of the TX 102 depicted in FIG. 1 and/or the TX 202 depicted in FIG. 2. In an example, the RXs 904-1, 904-2 depicted in FIG. 9 may be an embodiment of the RX 104 depicted in FIG. 1 and/or the RX 204 depicted in FIG. 2. Each of the first repeater 960-1 and the second repeater 960-2 may be fully or partially implemented as an integrated circuit (IC) device. For example, the transmitter (TX) 902-1 and the receiver (RX) 904-1 are located in the same substrate and the repeater 960-1 is implemented as one IC device (e.g., a system on chip (SOC)) for bi-directional communications. In another example, the transmitter (TX) 902-2 and the receiver (RX) 904-2 are located in the same substrate and the repeater 960-2 is implemented as one IC device (e.g., a system on chip (SOC)) for bi-directional communications. Although the depicted repeater system 900 is shown in FIG. 9 with certain components and described with certain functionality herein, other embodiments of the repeater system 900 may include fewer or more components to implement the same, less, or more functionality. In addition, although the repeater system 900 is shown in FIG. 9 as being connected in a certain topology, the network topology of the repeater system 900 is not limited to the topology shown in FIG. 9. The repeater system 900 may be a wired communications system or a wireless communications system.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A repeater comprising:

a frequency correction accumulator configured to generate a combined frequency correction based on a first frequency correction for compensating a mismatch between an input clock of a data source and a local transmitter clock and a second frequency correction for compensating a mismatch between the local transmitter clock and a local receiver clock; and an adjustable timer configured to apply the combined frequency correction to regenerate an input data stream.

2. The repeater of claim 1, further comprising a decoder configured to decode a plurality of symbols contained in data received over a repeater channel to generate the first frequency correction.

3. The repeater of claim 2, further comprising a difference calculator configured to generate the second frequency correction by comparing a symbol period of the symbols with a nominal symbol period.

4. The repeater of claim 1, wherein the frequency correction accumulator is further configured to combine the first frequency correction and the second frequency correction to generate the combined frequency correction.

5. The repeater of claim 1, wherein the adjustable timer is further configured to apply the combined frequency correction by controlling a recycling period of the repeater.

6. The repeater of claim 1, further comprising a modem configured to demodulate data received over a repeater channel to generate a plurality of frames.

7. The repeater of claim 6, further comprising a de-framer configured to process the frames to generate a plurality of symbols.

8. The repeater of claim 1, wherein the regenerated input data stream has same data rate as the data source.

9. The repeater of claim 8, wherein the data source has a latency requirement.

10. The repeater of claim 1, wherein the repeater comprises an embedded Universal Serial Bus (eUSB) repeater.

11. An embedded Universal Serial Bus (eUSB) repeater comprising:

a frequency correction accumulator configured to combine a first frequency correction for compensating a mismatch between an input clock of a data source and a local transmitter clock and a second frequency correction for compensating a mismatch between the local transmitter clock and a local receiver clock to generate a combined frequency correction; and an adjustable timer configured to apply the combined frequency correction to regenerate an input data stream, wherein the regenerated input data stream has same data rate as the data source.

12. The eUSB repeater of claim 11, further comprising a decoder configured to decode a plurality of symbols contained in data received over a repeater channel to generate the first frequency correction.

13. The eUSB repeater of claim 12, further comprising a difference calculator configured to generate the second frequency correction by comparing a symbol period of the symbols with a nominal symbol period.

14. The eUSB repeater of claim 11, wherein the adjustable timer is further configured to apply the combined frequency correction by controlling a recycling period of the eUSB repeater.

15. The eUSB repeater of claim 11, further comprising a modem configured to demodulate data received over a repeater channel to generate a plurality of frames.

16. The eUSB repeater of claim 15, further comprising a de-framer configured to process the frames to generate a plurality of symbols.

17. The eUSB repeater of claim 11, wherein the data source has a latency requirement.

18. A method of operating a repeater, the method comprising:

generating a combined frequency correction based on a first frequency correction for compensating a mismatch between an input clock of a data source and a local transmitter clock and a second frequency correction for compensating a mismatch between the local transmitter clock and a local receiver clock; and applying the combined frequency correction to regenerate an input data stream.

19. The method of claim 18, further comprising decoding a plurality of symbols contained in data received over a repeater channel to generate the first frequency correction.

20. The method of claim 19, further comprising generating the second frequency correction by comparing a symbol period of the symbols with a nominal symbol period.

* * * * *